United States Patent Office 3,706,011
Patented Dec. 12, 1972

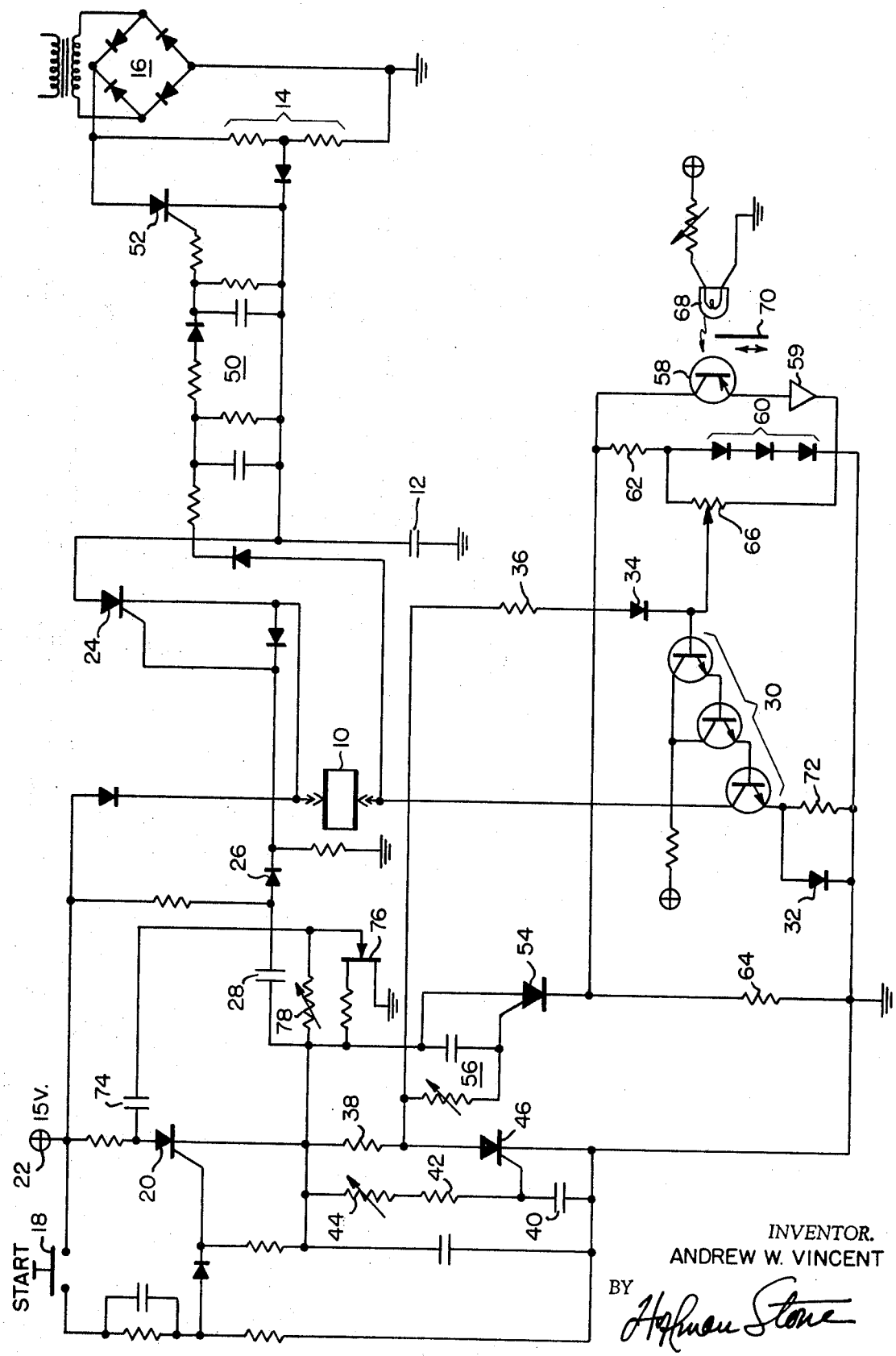

3,706,011
TIMER CIRCUIT FOR MAGNETIC ACTUATORS
Andrew W. Vincent, 65 Aberdeen St.,
Rochester, N.Y. 14611
Filed May 14, 1971, Ser. No. 143,386
Int. Cl. H01h 47/04
U.S. Cl. 317—151                                      2 Claims

ABSTRACT OF THE DISCLOSURE

A drive circuit for rapid energization of a solenoid, relay, or other electromagnetic device. The circuit develops a relatively high voltage at its output for a controllably variable, brief period to initiate motion of the driven device. This is followed by a brief interval during which current through the device is effectively cut off, and thereafter a relatively low holding voltage is developed to maintain the device partly or fully energized. Servo means are provided for sensing the advance of the device and for controlling the holding voltage to keep the device at a predetermined position for as long as desired.

BRIEF DESCRIPTION

The present invention arose as a result of efforts to improve the versatility and usefulness of the electrical photographic shutter described and claimed in the copending application for Pat. No. 816,535, filed Apr. 16, 1969, entitled Shock Absorbing Detent, and now Pat. No. 3,595,553. The shutter includes a pair of pivoted blades, normally in slightly overlapping position, which are driven apart by an electromagnetic actuator to open the shutter. Typically, for high opening speeds, the actuator is driven by discharging a highly charged capacitor through the winding of the actuator. If it was desired to hold the shutter open for longer than minimum times a follow on holding voltage of about 5 volts was applied after the capacitor was discharged. It was feasible to control the opening of the shutter by varying the size of the capacitor, or its charge, or both, but it was not heretofore possible to hold the shutter at a preselected partially open position by adjusting the follow on holding voltage. The shutter could function as a combination shutter and iris only for fairly rapid exposure times.

It has now been found that the shutter can be made to open very rapidly to any desired extent, and can be held partly or fully open at any desired setting for as long as desired. A high speed, very high gain amplifier, with negative feedback is used to hold the shutter open by controlling the current through the actuator in response to a sensor arranged to produce a signal indicating the instantaneous position of the shutter. The shutter is opened rapidly to the desired extent by partly discharging a capacitor through the actuator. Thereafter, in carefully timed relationship, the holding current is applied and maintained for the desired interval.

The capacitor is charged before each operation to a predetermined voltage such as about 100 volts, and the extent of the opening travel of the shutter is controlled by varying the time during which current is allowed to flow from the capacitor through the actuator. The shutter continues its opening travel for a measurable interval after the current is cut off, and the low voltage holding current is started during that interval, at a time such that the holding current builds up to the needed value just as the impetus of the starting energy is exhausted. The circuit can be readily calibrated to make the shutter open rapidly to any desired position and to hold it at that position without chatter, bounce, or hunting.

A subsidiary feature of the invention pertains to an arrangement for rapid charging of the capacitor. The capacitor is connected in series with a triggerable avalanche device across the output of a high voltage rectifier. The surge voltage produced by the collapse of the flux in the actuator when the current flow is cut off is integrated and applied to trigger the avalanche device and hold it in its highly conductive condition for a period equal to about two cycles of the fundamental frequency of the alternating component of the output of the rectifier. Thus, two successive output pulses of the rectifier are fed to the capacitor for charging it in minimum time and thereby ready the circuit quickly for another operating sequence.

It is expected that the practice of the invention will be advantageous in many utilizations besides the shutter, which is regarded as but one example of an electromagnetic actuator. In other instances, too, it is desired to advance an actuator rapidly only part way through its travel, and then to hold it. The circuit of the invention can readily be modified to match the operating characteristics of any actuator.

DETAILED DESCRIPTION

A presently preferred embodiment of the invention will now be described in conjunction with the drawing, wherein the single figure is a schematic circuit diagram of an actuator control circuit according to the invention.

The circuit shown is arranged to control the energization of the coil 10 of an electromagnetic actuator, which in the case illustrated may be the shutter actuator referred to hereinabove. The starting capacitor 12 is of fairly large value, say 150 microfarads, and is normally held charged to a predetermined voltage of about 100 volts by a voltage divider 14 which is connected across the output of a full wave high voltage rectifier 16.

Operation is started by manual actuation of the START switch 18, or by otherwise triggering a master SCR 20, which is driven from a low voltage source 22, typically about 15 volts. The trigger electrode of a START SCR 24 is connected through a diode 26 and a coupling capacitor 28 to the cathode of the master SCR 20. The START SCR 24, therefore, fires substantially simultaneously with the master SCR 20. The START capacitor 12 discharges through the START SCR 24, the winding 10 of the actuator, the output stage of a control amplifier 30, and a diode 32. The amplifier 30 is arranged in a tandem Darlington style to provide very high gain and high current capacity in its output stage. The input of the control amplifier 30 is connected through a diode 34 and resistors 36 and 38 to the cathode of the master SCR 20. The amplifier 30 becomes biased to saturation when the master SCR 20 fires, and substantially the entire voltage on the capacitor 12 appears across the winding 10 to achieve a fast rise time in the current through the winding.

Current flowing through the master SCR 20 charges the START timing capacitor 40, which is connected, in series with a limiting resistor 42, a variable control resistor 44, and the master SCR 20 to trigger an END PULSE SCR 46 to cut off the starting current. The anode of the END PULSE SCR 46 is connected to the junction between the resistors 36 and 38 at the input of the amplifier 30, and acts to cut off the amplifier 30 when the SCR 46 fires.

Cutting the amplifier 30 blocks current flow through the START SCR 24, cutting it off also. The potential at the cathode of the master SCR 20 also drops at this time, reducing the potential on the trigger electrode of the START SCR 24 to ensure positive cut off of it.

Due to both electrical and mechanical momentum, the actuator (not shown) continues to advance after the amplifier 30 is cut off. The surge voltage developed by the collapse of the flux in the winding 10 is integrated by an RC network 50 to produce a signal lasting for approximately two cycles of the fundamental A.C. component of the output of the rectifier 16. This signal is applied to trigger a charging SCR 52 which is connected in series between the rectifier 16 and the START capacitor 12. The charging SCR 52 is thus held conductive for two cycles of the A.C. component, ensuring rapid charging of the capacitor 12 to prepare it for the next operating sequence.

The inductance of the shutter actuator 10 is of relatively low value, and the surge voltage developed by it is not high enough to break down the output stage of the amplifier 30. If the circuit is to be used for driving actuators having greater inductance, it may be desirable to add circuit components to limit the surge voltage. There are several known ways of doing this. For example, either the actuator 10 or the output stage of the amplifier 30 may be shunted by a clipper, or the network 50 may be designed to have a relatively low input impedance.

At some empirically determined time after the control amplifier 30 is cut off, and slightly before the initially induced advance of the actuator ends, the amplifier 30 is again turned on. This is brought about by firing of the sustaining SCR 54, which is of the complementary type and fires in response to a drop of the potential of its trigger electrode. The sustaining SCR 54 is connected through a variable RC delay circuit 56 to fire at a selected time after the END PULSE SCR 46 fires. The output of the sustaining SCR 54 is applied from its cathode to energize a photo-transistor 58, which is connected as an emitter follower to drive an auxiliary amplifier 59, which in turn drives the control amplifier 30. The series of diodes 60 connected in series with a limiting resistor 62 across the cathode resistor 64 of the sustaining SCR 54 provides the bias voltage for the input of the amplifier 30.

The input signal to the control amplifier 30 during this, the sustaining phase of the operation, may be controlled by varying the point along the output resistor 66 of the auxiliary amplifier 59 from which the input of the amplifier 30 is taken. Alternatively, the input signal may be controlled by varying the energization of the light source 68 directed at the phototransistor. An interposer 70 is fixed to one of the shutter blades, or otherwise arranged to move with the armature of the actuator and to project between the light source 68 and the photo-transistor 58, typically reducing the light received by the photo-transistor as the armature advances.

An emitter resistor 72 is connected in series with the emitter of the output stage of the amplifier 30 to provide negative feedback, thus to slow the response of the amplifier to match the response characteristics of the actuator. If the emitter resistor 72 is omitted, the circuit may be unstable and tend to produce a hunting effect on the actuator. The value of the emitter resistor 72 is preferably chosen so that the bias produced by it does not exceed the forward breakdown voltage of the diode 32 connected in parallel with it. Depending on the characteristics of the actuator to be driven, it may be necessary to increase the value of the emitter resistor to increase the negative feedback, in which case one or more additional diodes may be needed in series with the diode 32.

The amplifier 30 is thus biased and driven as a servo to keep the actuator at the selected point in its travel, and it does this until the master SCR 20 is cut off. This may be done under manual control if desired, or more conveniently when operating times of fairly short duration are desired, by the timing circuit portion illustrated, which includes a timing capacitor 74 and a unijunction transistor 76.

When the master SCR 20 fires, the timing capacitor 74 starts to charge through a variable resistor 78, and when it charges sufficiently it triggers the unijunction transistor 76, thereby creating a very low impedance shunt across the series arrangement consisting of the master SCR 20 in series with the END PULSE and sustaining SCR's 46 and 54, which are in parallel with each other. The three SCR's 20, 46, and 54 are thus turned off, and the cathode of the sustaining SCR 54 drops to ground potential, turning the control amplifier 30 off also, thereby de-energizing the actuator. At this time, the surge voltage produced in the winding 10 of the actuator is again integrated by the network 50 and applied to the charging SCR 52 to allow another two cycles of the supply voltage to charge the START capacitor 12.

In many instances the holding time of the circuit may be set to values significantly shorter than two cycles of the A.C. component of the output of the rectifier 16, in which case the two successive integrations in the network 50 will overlap. In practice it has been found that overlapping of this kind has very little effect on the calibration of the circuit. In most cases, there is adequate time between successive operations of the circuit for the charge in the capacitor 12 to be stabilized at the desired predetermined value by the voltage divider 14. If the successive operations are too closely spaced there may not be enough time for the capacitor 12 to be fully charged, in which case the starting energization of the actuator will be less than normal, and the control amplifier 30 will cause the actuator to hunt briefly before it stops in its desired position. In most cases the hunting is very brief and not objectionable. Hunting of this nature in very rapid repetitive operation, may be avoided by adjusting the START timing resistor 44, or by modifying the arrangement for charging the capacitor 12 to ensure that it charges to the standard value during the available interval. The arrangement shown is thought to be fully adequate for most utilizations.

There are four major variables in the circuit as shown. First, the overall time, the length of the interval from the closing of the START switch 18 to final de-energization, which is controlled by varying the value of the resistor 78 that controls charging of the timing capacitor 74. The other three variables are preferably ganged. They are the duration of the START interval, which is controlled by the variable resistor 44 connected to the trigger electrode of the END PULSE SCR 46, the time from the end of the START interval to the beginning of the holding current, which is controlled by the resistor 56 connected to the sustaining SCR 54, and the value of the holding current, which is controlled by the variable voltage divider 66 at the input of the amplifier 30 or by varying the energization of the light source 68.

In general, if the START interval is short, the succeeding interval must be proportionately short and the holding current proportionately small. Conversely, if the START interval is relatively long, the succeeding interval and the holding current must be proportionately increased.

What is claimed is:

1. A drive circuit for rapid energization of an electromagnetic device comprising:
    (a) means for connecting a low impedance source of current at a high voltage across the device in response to a predetermined signal,
    (b) means for cutting off current through the device at the end of an interval of adjustable duration following the predetermined signal and before the device has completed its full allowable travel,
    (c) means for connecting the device to a source of holding current for an interval of any arbitrarily selectable duration starting after the interval of adjustable duration and before motion of the driven device stops,
    (d) means for producing a signal indicative of the instantaneous position of a member driven by the electromagnetic device, and
    (e) a servo amplifier responsive to said signal producing means for controlling the value of the holding current.

2. A drive circuit for rapid energization to a controllable degree of an electromagnetic device of the kind including a member drivable through a predetermined travel comprising:
(a) a first triggerable avalanche device,
(b) means for triggering said avalanche device in response to a predetermined signal,
(c) a second triggerable avalanche device connected to fire in response to firing of said first avalanche device,
(d) an amplifier having an output stage connected, during operation, in series with the device to be driven,
(e) a capacitor,
(f) means for charging said capacitor to a voltage at least several times the voltage that can be maintained for long periods across the device to be driven without damaging it, and with enough energy to drive the device to be driven through its full travel,
(g) means connecting said capacitor in series with said second avalanche device and the output stage of said amplifier across the device to be driven,
(h) means connecting said first avalanche device to the input of said amplifier to drive said amplifier to saturation when said first avalanche device fires,
(i) a third avalanche device connected in series with said first avalanche device,
(j) adjustable timing means for firing said third avalanche device at the end of a predetermined interval following firing of said first avalanche device,
(k) said third avalanche device being arranged to cut off said amplifier when said third avalanche fires, thereby cutting off current through the device being driven and also cutting off said second avalanche device,
(l) a fourth avalanche device,
(m) timing means responsive to firing of said first avalanche device for triggering said fourth avalanche device at an adjustably selectable time after said predetermined interval ends,
(n) a current source having a constant output voltage close to the maximum voltage sustainable for prolonged periods by the driven device,
(o) means connecting said current source in series with the driven device and the output stage of said amplifier and isolated from said capacitor,
(p) said fourth avalanche device being connected to apply a forward biasing voltage to said amplifier while said fourth avalanche device is conducting current,
(q) means for producing a signal indicative of the instantaneous position of the member drivable by the driven device,
(r) means for applying the signal produced by said producing means to said amplifier in combination with the bias applied by said fourth avalanche device, thereby to drive said amplifier as a servo to control the current through the driven device, and
(s) timing means for cutting off said first, third, and fourth avalanche devices at the end of a selectable interval following firing of said first avalanche device.

References Cited

UNITED STATES PATENTS 3,605,588   9/1971   Ort et al. _____ 95—10 CD

J D MILLER, Primary Examiner

H. E. MOOSE, Jr., Assistant Examiner

U.S. Cl. X.R.

95—10 CD; 317—DIG 6, 154